(12) United States Patent
Goers

(10) Patent No.: US 7,740,789 B2
(45) Date of Patent: Jun. 22, 2010

(54) METHOD FOR ELIMINATING DETRIMENTAL EFFECTS OF FLASH ON CUPS USED FOR SPORT STACKING

(75) Inventor: John L. Goers, Castle Rock, CO (US)

(73) Assignee: Speed Stacks, Inc., Englewood, CO (US)

( * ) Notice: Subject to any disclaimer, the term of this patent is extended or adjusted under 35 U.S.C. 154(b) by 882 days.

(21) Appl. No.: 11/539,794

(22) Filed: Oct. 9, 2006

(65) Prior Publication Data

US 2007/0117701 A1 May 24, 2007

Related U.S. Application Data

(60) Provisional application No. 60/734,910, filed on Nov. 8, 2005.

(51) Int. Cl.
*B28B 1/24* (2006.01)

(52) U.S. Cl. .................. 264/334; 425/441; 425/443; 425/542

(58) Field of Classification Search .................. 264/334; 425/441, 443, 542
See application file for complete search history.

(56) References Cited

U.S. PATENT DOCUMENTS

| | | | |
|---|---|---|---|
| 1,592,395 A | 7/1926 | Sulzberger | |
| 2,062,897 A | 12/1936 | Michel et al. | |
| 2,667,422 A | 1/1954 | Kauffman | |
| 2,766,796 A | 10/1956 | Tupper | |
| 3,526,316 A | 9/1970 | Kalogris | |
| 3,649,010 A | 3/1972 | Jeffrey et al. | |
| 3,785,647 A | 1/1974 | Bender | |
| 3,795,823 A | 3/1974 | Morgan et al. | |
| 3,878,675 A | 4/1975 | Prociuk | |
| 3,920,120 A | 11/1975 | Shveda | |
| 4,096,966 A | 6/1978 | Korshak | |
| 4,186,215 A | 1/1980 | Buchel | |
| 4,220,330 A | 9/1980 | Montgomery | |
| 4,307,866 A * | 12/1981 | Brown | 249/63 |
| 4,375,601 A | 3/1983 | Van Vliet | |
| 4,388,996 A | 6/1983 | Panicci | |
| 4,392,176 A | 7/1983 | Kneip et al. | |
| 4,518,266 A | 5/1985 | Dawley | |
| 4,586,709 A | 5/1986 | Godinet | |

(Continued)

FOREIGN PATENT DOCUMENTS

JP 10086945 4/1998

OTHER PUBLICATIONS

Lee, Norman C., "Control Flash in Extrusion Blow Molding", Plastics Technology, Sep. 2002, 2 pages.

(Continued)

*Primary Examiner*—Joseph S Del Sole
*Assistant Examiner*—Stephen Sollenberger
(74) *Attorney, Agent, or Firm*—Sheridan Ross P.C.

(57) ABSTRACT

A method of making a cup that decreases the amount of flash on a bottom surface of the cup is provided. More specifically, a cup is provided that includes a thickened lip around an open surface. The lip also includes a recess for the receipt of excess material generated by the molding process. This excess material, or flashing, is detrimental to the use of cups in cup stacking competitions.

8 Claims, 8 Drawing Sheets

U.S. PATENT DOCUMENTS

| | | |
|---|---|---|
| 4,700,369 A | 10/1987 | Siegal et al. |
| 4,703,930 A | 11/1987 | Gilbert |
| 4,818,234 A | 4/1989 | Redington et al. |
| 4,877,407 A | 10/1989 | du Pont et al. |
| 5,019,950 A | 5/1991 | Johnson |
| 5,057,965 A | 10/1991 | Wilson |
| 5,284,343 A | 2/1994 | Bigornia et al. |
| 5,480,159 A | 1/1996 | Alsip |
| 5,652,975 A | 8/1997 | Hoskin |
| 5,838,638 A | 11/1998 | Tipton et al. |
| 5,844,861 A | 12/1998 | Maurer |
| 5,882,011 A | 3/1999 | Praria |
| 5,933,102 A | 8/1999 | Miller et al. |
| 5,947,478 A | 9/1999 | Kwan et al. |
| 6,181,647 B1 | 1/2001 | Tipton et al. |
| 6,229,764 B1 | 5/2001 | Tongue |
| 6,328,666 B1 | 12/2001 | Manory |
| 6,402,647 B1 | 6/2002 | Haseltine |
| 6,940,783 B2 | 9/2005 | Fox et al. |
| 7,042,806 B2 | 5/2006 | Fox et al. |
| 2002/0146482 A1* | 10/2002 | Rick .......................... 425/556 |
| 2003/0077360 A1 | 4/2003 | Ramon |

OTHER PUBLICATIONS

U.S. Appl. No. 10/215,685, Goers et al.
U.S. Appl. No. 11/536,903, Goers.
"Welcome to OnlinConversion.com" available at www.onlineconversion.com; printed Feb. 9, 2005; 1 page.
"Welcome to the VCB Kids Speed Stacks Page!" available at www.vcbkids.org; printed Mar. 4, 2005; 3 pages.
www.speedstacks.com; printed on Mar. 3, 2004, 8 pages.

* cited by examiner

METHOD FOR ELIMINATING DETRIMENTAL EFFECTS OF FLASH ON CUPS USED FOR SPORT STACKING

This application claims the benefit of U.S. Provisional Patent Application Ser. No. 60/734,910, filed Nov. 8, 2005, which is incorporated by reference in its entirety herein.

FIELD OF THE INVENTION

Embodiments of the present invention are generally related to shaping a molded article. More specifically, a method is provided for repositioning excess molded material, i.e. "flashing", that results during the molding process so that it does not influence the molded article during its intended use.

BACKGROUND OF THE INVENTION

Sport Stacking involves stacking specially designed cups in pre-determined sequences as fast as possible and is often incorporated into school physical education curriculums because it inherently increases student's hand eye coordination and reaction time. In addition to specialized cups, a specialized stacking surface is also usually employed that provides friction to help prevent sliding of the cups. The specialized surface is typically comprised of a neoprene foundation with a polyester fabric bonded to the top surface of the foundation, a composition often employed in the construction of computer mouse pads. Specialized cups are required to practice the sport and the cups must have certain features that allow them to slide easily against one another and against the stacking surface.

More specifically, sport stacking cups exhibit certain properties that are desirable for fast stacking such as smooth top and bottom surfaces wherein the cups can be dragged across the stacking surface without the top or bottom surface of the cup catching on the stacking surface. If a cup catches, drags or is in any way impeded by the stacking surface, the cup stacker will need to apply additional force to pull the cup into position which may slow the stacking process. Further, as one skilled in the art will appreciate, a rough surface may cause a stacked or placed cup to tip.

Cups used for sport stacking are typically injection molded from polymers, i.e. plastics. Injection molding is a popular manufacturing technique for making parts from thermoplastic material. Molten plastic is injected at high pressure into a mold that is inverse of the desired shape. The mold is made of metal, either steel or aluminum, and precision machine to form the features of the desired part. Injection molding is widely used for manufacturing a variety of parts, from the smallest component to the entire body panels of automobiles. It is the most common method of production with some commonly made items including bottle caps and outdoor furniture.

The molds used in injection molding generally include slidingly mated moving elements. During the use, wear between the moving elements create a gap therebetween that is apt to receive molten plastic during the molding process. After the molded part is removed the excess plastic forms unwanted protrusions on the part, typically known as "flash" to those skilled in the art. The occurrence of flash may be reduced by maintaining the mold periodically which involves replacing or refinishing the surfaces of certain parts of the mold but some degree of flash is usually present, even with a properly maintained mold.

In order to provide a stacking cup with smooth surface, the flash must be removed in a post processing application. Since such an operation is often time consuming, labor intensive, and costly, it is desirable to mold parts in such a way that post processing of parts is minimized or eliminated. For example, trimming to remove unwanted flash is not desirable since the labor involved in doing so may make the parts uneconomical to produce and also because under or over trimming a part may result in a reject. Post-molding inspection associated with flash further reduces the cost effectiveness of the manufacturing process.

Molds used for forming a cup are generally comprised of a core, which can be any profile, but often have a conical outer surface that forms the inner surface of the finished cup. The outer surface of the cup is defined by a cavity that is positioned a predetermined distance from the core to define the thickness of the finished cup. During forming, heated polymer is injected into the mold thereby filling the space provided between the core and the cavity. Subsequent to injection, the part is allowed to cool, i.e. cure, so that it can be removed from the mold. During this cooling process, the cup will necessarily contract about the core. Removal of the cup begins with removal of the cavity thereby exposing the outer surface of the cup. A stripper plate, which was previously positioned beneath the cavity, is transitioned relative to the stationary core thereby disengaging the cup from the mold. This movement is a source of the wear and tear on both a stripper plate and the core that potentially causes a gap. The gap, as described above, is very apt to receive material that escapes from the mold thereby creating flash.

As mentioned above, the construction of an injection mold for making a cup is typically such that a moving plate or "stripper" is required for removing the cup from the mold after the polymer is injected therein and cured. Stacking cups often include a thickened lip about their open end, similar to common drinking cups, that strengthens the opened end of the cup ("bottom" as used herein) and provides a detente that engages a lip of an adjacent cup when a plurality of cups are stacked within each other. Given the lip configuration of sport stacking cups, the joint between the stripper and the inner portion of the mold (also known as the "core") is located directly on the bottom of the lip of the cup. To disengage the cup from the core, the stripper plate moves relative to the core, therefore, the joint between the core and the stripper plate is non-static and subject to the wear that is often attributed to flash being present on the bottom surface of the cup. Flash is detrimental to the cups for use in sport stacking because the flash will often catch on the stacking surface. Therefore, a method for eliminating the detrimental effects of flash at this point on the cups is of great advantage in the design of cups for sport stacking. Indeed such a method has been discovered.

Thus it is a long felt need in the field of injection molding of cups to provide a method of reducing flash, specifically flash adjacent to the bottom edge of the cup. The following disclosure describes and improved method of injection molding a cup to be used in cup stack competitions that decreases the amount of flash associated with the bottom lip thereof that would come in contact with the stacking surface.

SUMMARY OF THE INVENTION

It is one aspect of the present invention to provide a method of injection molding that decreases the amount of flash associated with a portion of the stacking cup that comes in contact with a cup stacking surface. More specifically, as described above, cups used in cup stacking competitions include a top, a bottom and a sidewall therebetween. It is important to note, "bottom" as used herein is counter to what most would consider the bottom of a cup, i.e. the closed portion. The terminology as used herein is more apt to cup stacking wherein generally cups are stacked bottoms-up wherein the "top" edge bounds the closed portion of the cup. Review of the figures identified below will make this definition more clear. As also described above, the joint between a mold core and a stripper plate, which is used to disengage a finished cup from the core, is often the source of flash. This joint is often positioned in the middle of a thickened lip positioned about the open end, i.e., "bottom", of the finished cup. This flash location is common because forces generated by disengaging the cup from the core require that force be applied to the cup at the center of the lip. By applying force to a thicker portion of the cup, occurrences of cup damage are reduced.

Thus it is an aspect of the invention not necessarily to eliminate flash, but to reposition it. One embodiment of the present invention utilizes a stripper plate with a novel profile that dictates the position of the flash. That is, it is not a goal of the present invention to completely eliminate flash, conversely, it is understood that flash almost always occurs. One goal of the present invention is to place the flash in a non-critical location such that post production flash removal is not required. Thus embodiments of the present invention are provided with a stripper plate with a unique profile that affects the form portion of the lip. As opposed to using a profile with a generally horizontal edge, a sharp tip is provided by one embodiment of the present invention such that when flash occurs, it forms away from the surface of the cup that will contact the stacking mat. For example, flash may be located towards the interior portion of the cup or towards the outer portion of the cup thereby providing a generally flash-free surface for interaction with the stacking mat.

It is also contemplated that the profile of the stripper plate may include an upwardly depending protrusion that forms a recess lip of the cup that provides a home for the flash. The lip would have an inner surface and an outer surface that would come in contact with the stacking mat.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
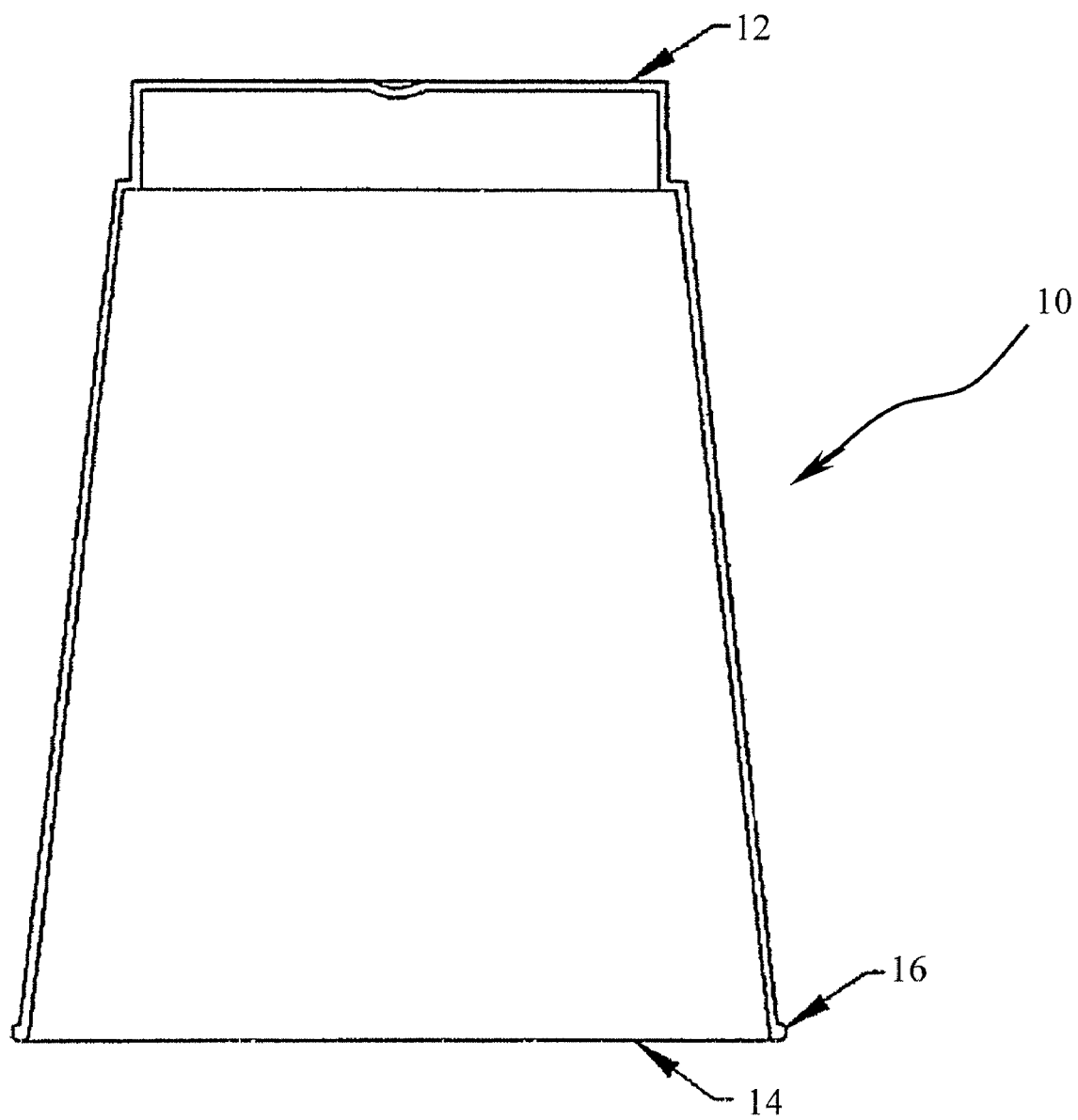
FIG. 1 is a cross sectional view of a stacking cup.

To assist in the understanding of the present invention the following list of components and associated numbering found in the drawings is provided herein:

| Component | # |
|---|---|
| Stacking cup | 10 |
| Top | 12 |
| Bottom | 14 |
| Lip | 16 |
| Flash | 18 |
| Mold core | 20 |
| Mold cavity | 22 |
| Stripper plate | 24 |
| Joint | 26 |
| Sharp edge | 28 |
| Recess | 30 |
| Outer portion | 32 |
| Inner portion | 34 |
| Outer recess | 36 |
| Inner recess | 38 |
| Outer surface | 40 |
| Inner surface | 42 |
| First protrusion | 44 |
| Second protrusion | 46 |
| Volume | 48 |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Referring now to FIG. 1, a cross section of a typical sport stacking cup 10 with a top 12, a bottom 14 and a lip 16. The bottom 14 is the surface of the cup that typically rests against a specialized stacking surface during stacking that is sensitive to the presence of flash.

Figure 2:
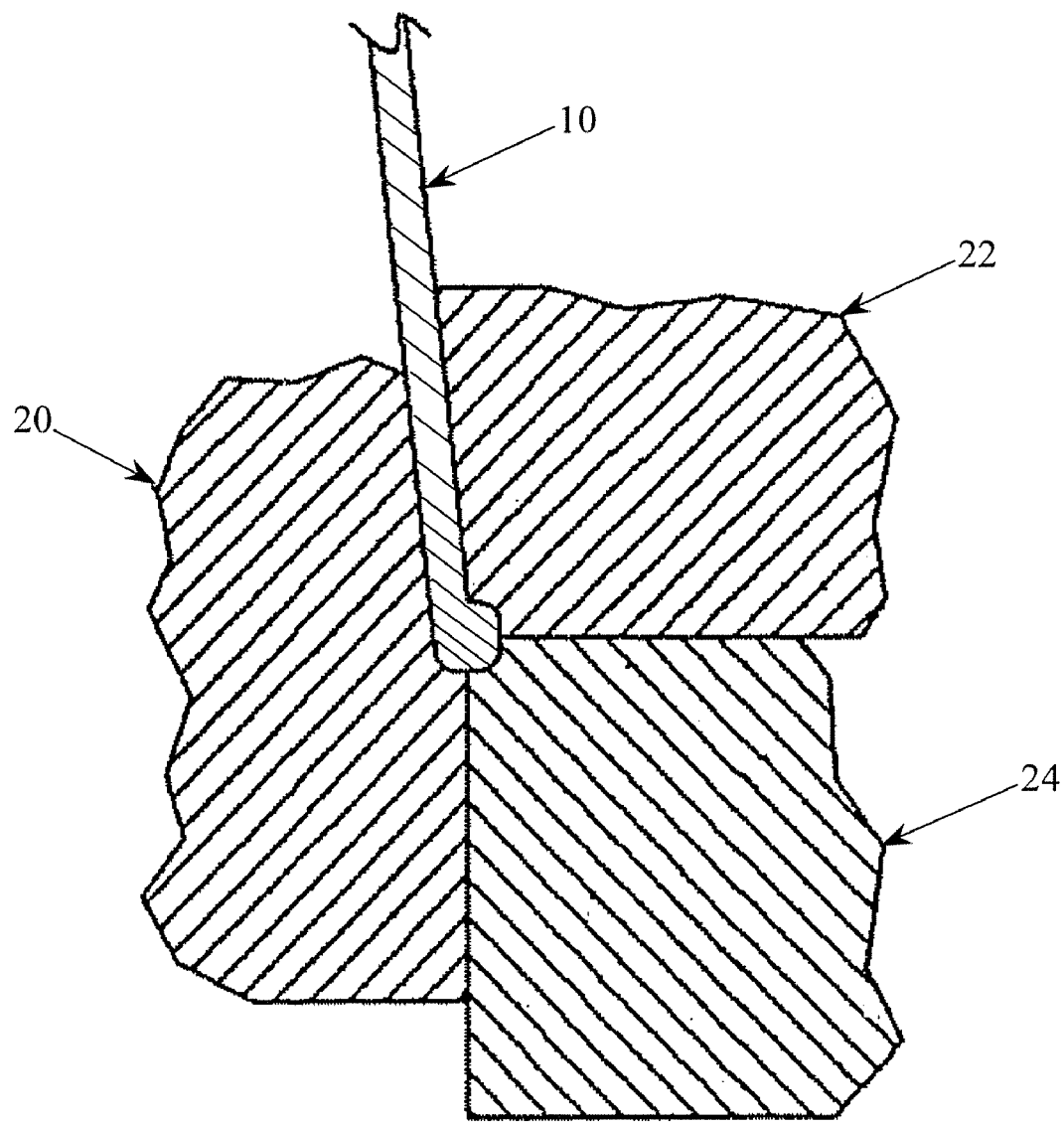
FIG. 2 is a partial cross sectional view of a stacking cup positioned in a mold of the prior art.
Figure 3:
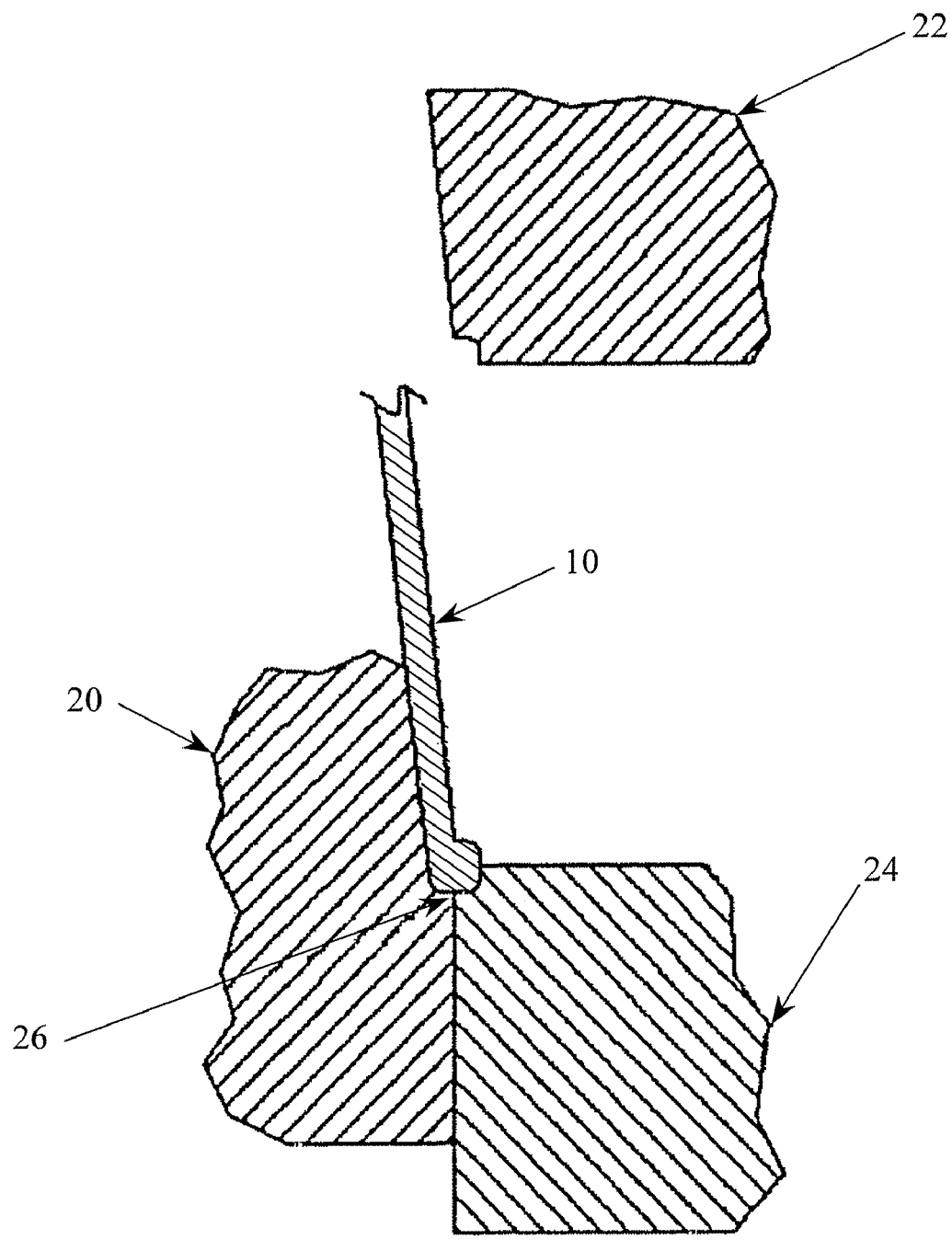
FIG. 3 is a partial cross sectional view similar to that of FIG. 2 wherein a cavity portion of the mold has been disengaged from the stacking cup.
Figure 4:
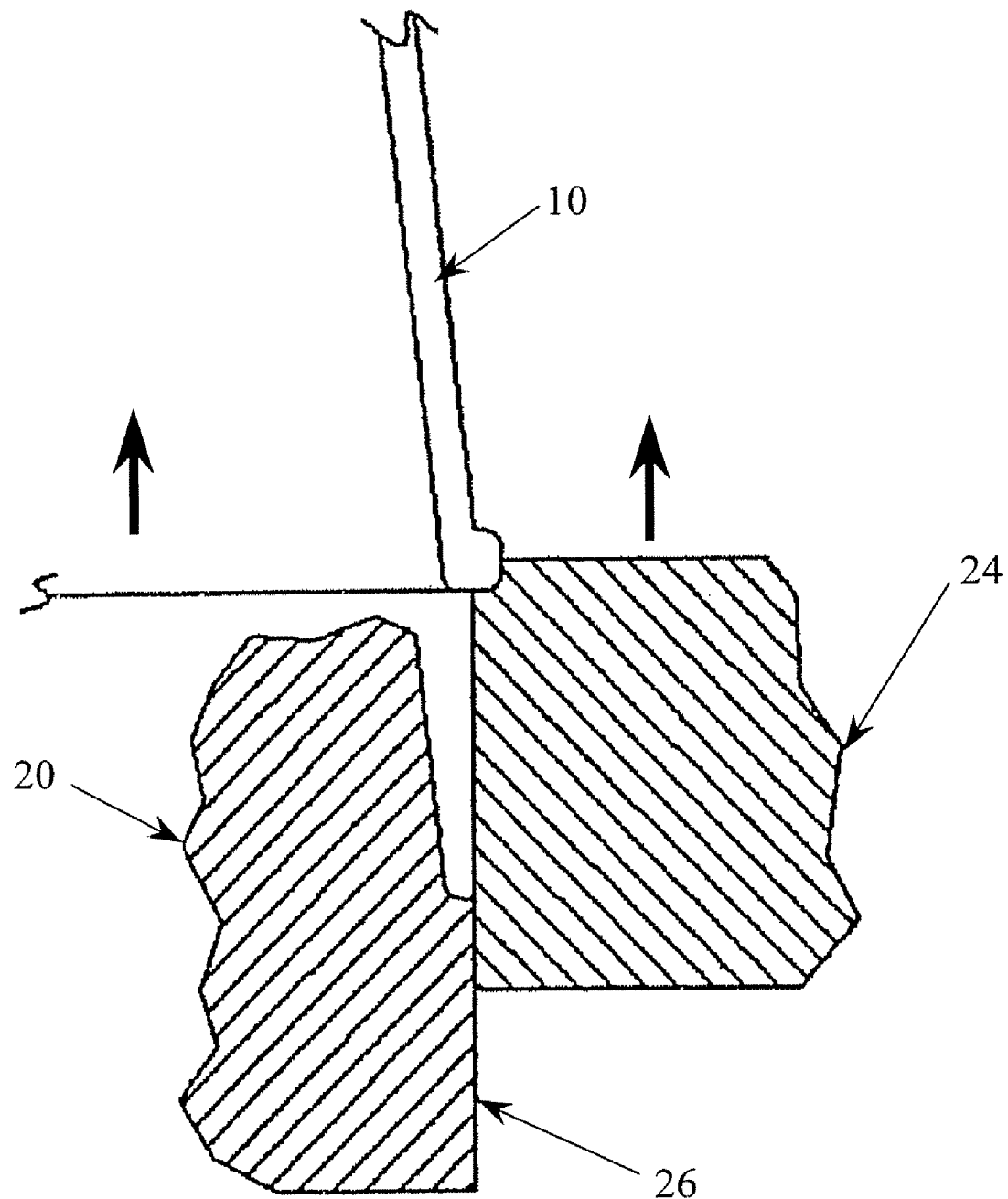
FIG. 4 is a partial cross sectional view similar to that of FIG. 2 showing the transition of a stripper plate that removes the stacking cup from the core portion of the mold.

Referring now to FIGS. 2-4, the typical manner in which a stacking cup 10 is injection molded is shown. The surfaces of the stacking cup 10 are formed by three different elements of the mold including the core 20, the cavity 22 and the stripper plate 24. FIG. 2 shows the mold elements in the "mold closed" position during which molten polymer is injected into a volume 48 (see FIG. 8, for example) of the mold to form the cup 10. Following polymer injection and subsequent cooling, the stacking cup 10 is ejected from the mold by first retracting the cavity 22 as shown in FIG. 3. At this point the stacking cup 10 is located on the outer surface of the core 20. To remove the stacking cup 10 from the core 20, the stripper plate 24 moves relative to the core thereby pulling the stacking cup 10 away from the core 20 as shown in FIG. 4. Note that the stripper plate 24 acts only on the outer half of the lip 16 of the stacking cup 10 and that the joint 26 between the stripper plate 24 and the core 20 is located at the midpoint of the lip 16.

Figure 5:
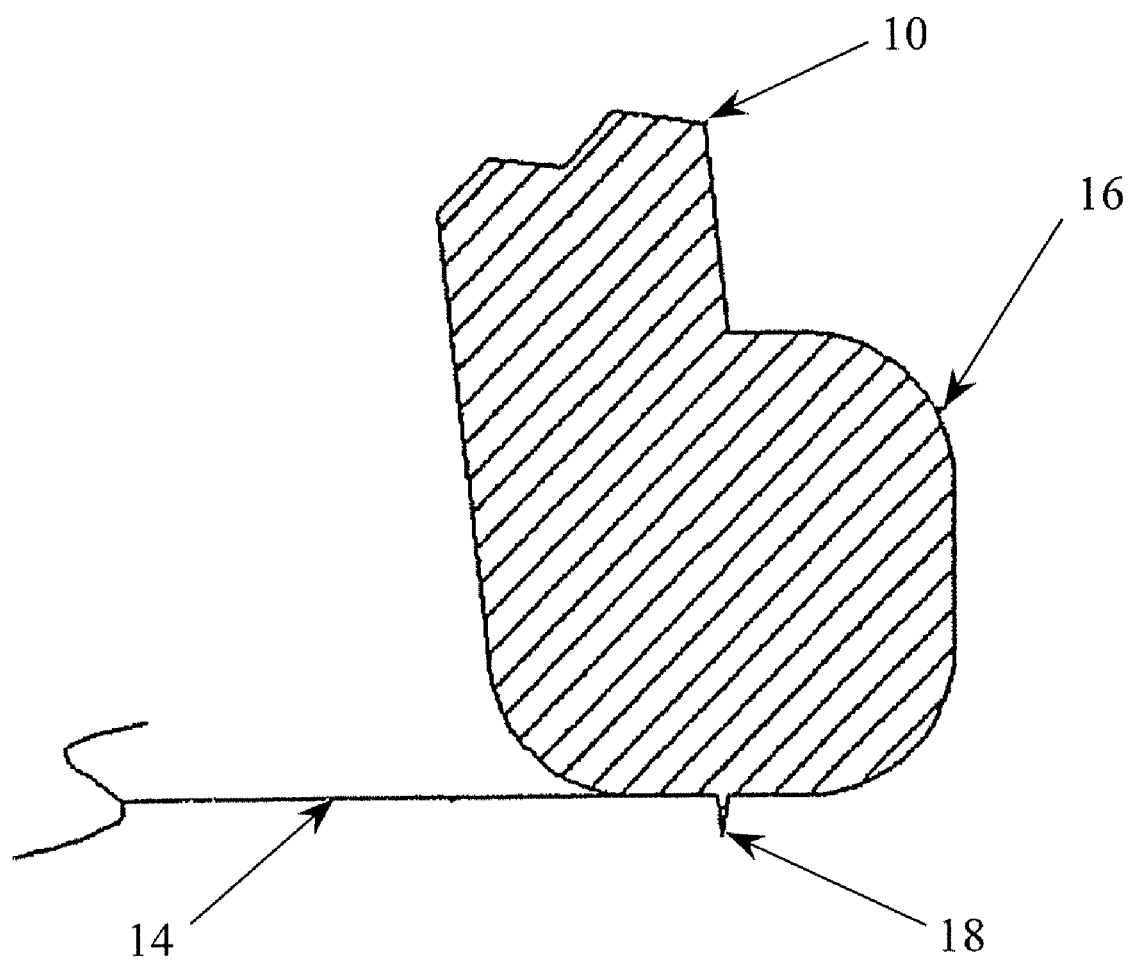
FIG. 5 is a partial cross sectional view of a lip of the stacking cup showing flash.

Referring now to FIG. 5, the bottom surface 14 of the stacking cup 10 is generally not smooth because of the presence of flash 18 caused by an expanded core-to-stripper plate joint that forms as a result of normal wear. The presence of flash 18 is detrimental since it is prone to catch on the stacking surface. In addition, flash 18 often effects the balance of the stacking cup 10.

Figure 6:
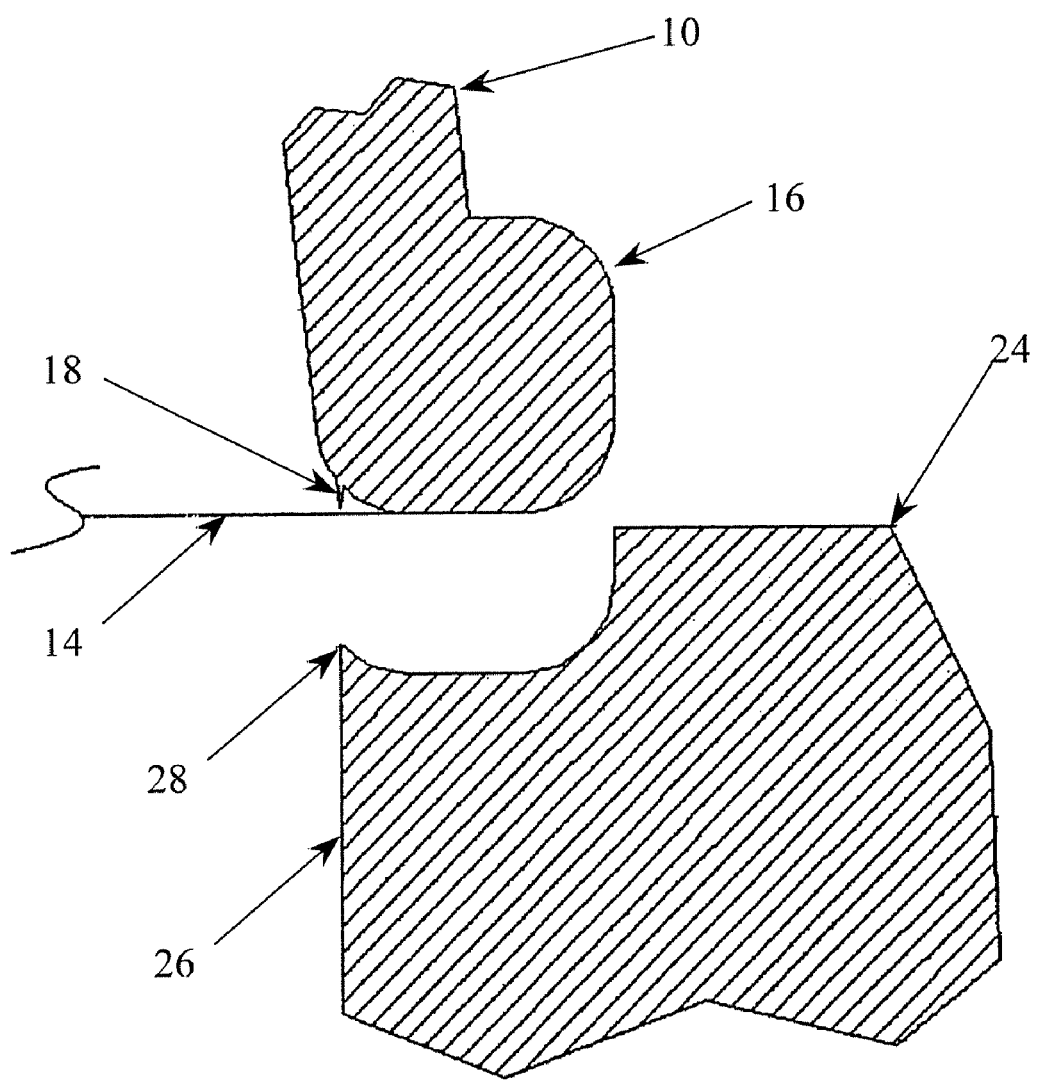
FIG. 6 is a partial cross sectional view of the lip of the cup stacking showing one embodiment of a method for eliminating the detrimental effects of flash on a bottom surface of the stacking cup.

Referring now to FIG. 6, one solution to the problem created by the presence of flash 18 on the bottom 12 of the stacking cup 10 is to locate the joint 26 between the core and the stripper plate 24 in a position on the lip 16 wherein the resulting flash 18 is not located directly on the lowest point of the stacking cup 10. Shown here, the flash 18 is positioned further up the inside radius of the lip 16, however, one skilled in the arts will appreciate that the flash may be repositioned on the outside radius of the lip 16 as well. One disadvantage of this approach is that one of the two mold elements, either the stripper 24 or the core, must wrap around the lip 16 thereby requiring a sharp edged 28 feature on that element that may wear very quickly, resulting in a poorly formed cup and/or excessive mold maintenance.

Figure 7:
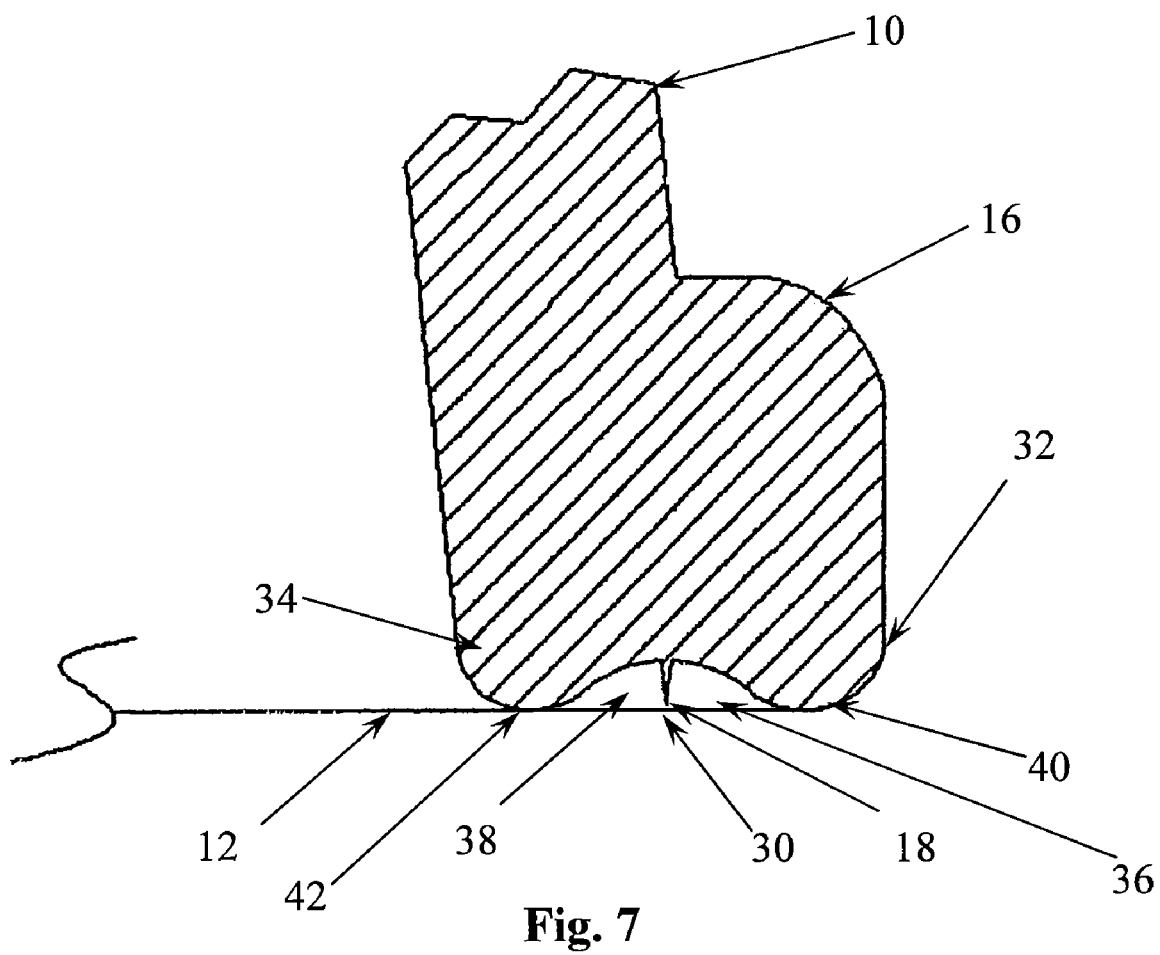
FIG. 7 is a partial cross sectional view of the lip of the cup stacking showing one embodiment of a method for eliminating the detrimental effects of flash on a bottom surface of the stacking cup.
Figure 8:
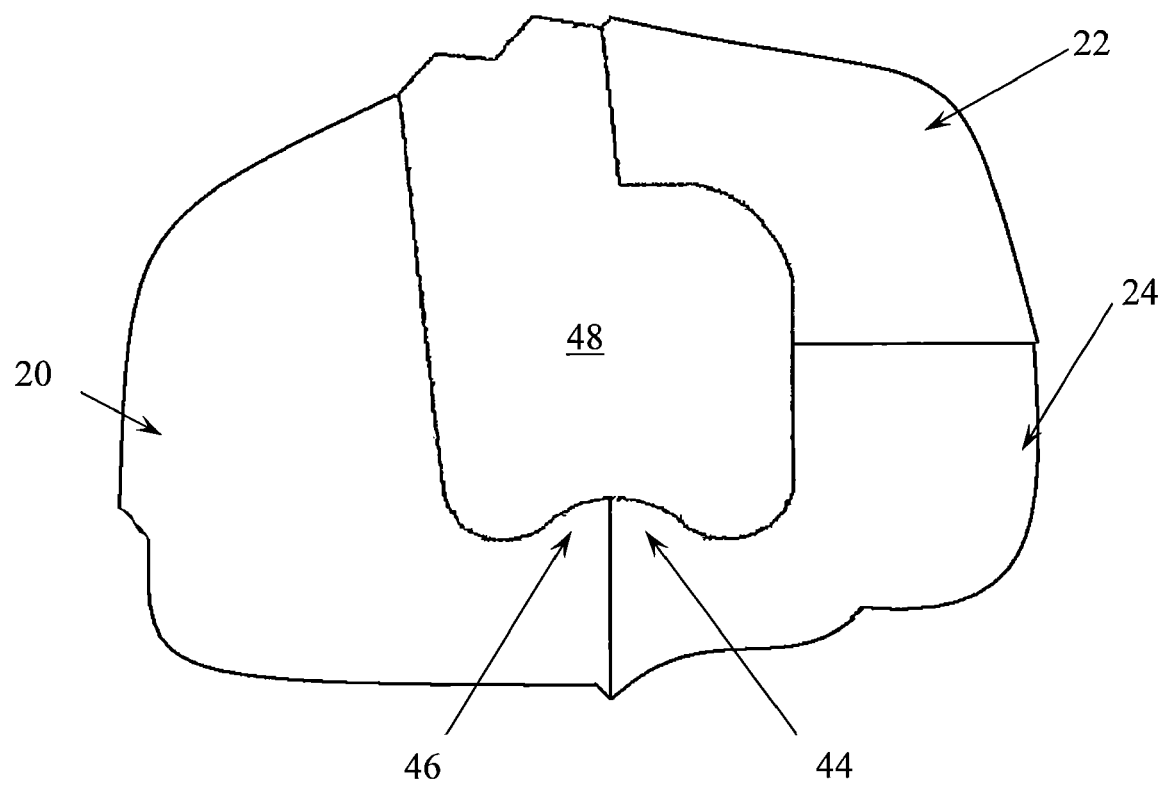
FIG. 8 is a partial cross sectional view of a mold associated with the cup of FIG. 7.

Referring now to FIGS. 7 and 8, a method for eliminating the detrimental effects of flash 18 associated with the lip 16 of the stacking cup 10 without creating a sharp edged feature neither the core or stripper of the mold is shown. A recess 30, which is comprised of an outer portion 40 and an inner portion 42, is incorporated into the lip 16 of the stacking cup 10 by altering the profile of at least one of the core 20 and stripper plate 24. The flash 18 will be thus be positioned with the recess 30, which comprises an outer recess 36 and an inner recess 38, in such a way that the flash 18 is not able to catch on the stacking surface during cup stacking. In operation, the inner recess 38 and the outer recess 36 are formed by a first protrusion 44 associated with the stripper plate 24 and a second protrusion 46 associated with the core 20. Although a recess 30 bounded by rounded surfaces is shown, the recess 10 may have any number of shapes including square, rectangular, triangular, two or more flat surfaces or any other configuration sufficient to form a recess to shield the flash 30. The recess 30 must have sufficient depth to shield the flash but the actual depth may be whatever is required to shield the specified maximum flash for this area, a parameter is typically specified by a molding specification. The recess 30 on the lip 16 does not have any detrimental effects on the cups during stacking.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A method of making a cup used in cup stacking competitions comprising:
   providing a mold having:
   a core that defines an inner surface of the cup,
   a cavity spaced a distance from the core that defines an outer surface of the cup, the space between the core and the cavity defining a volume to receive a material,
   a stripper plate positioned adjacent to the core and below the cavity, the stripper plate having an annulus that defines a lip of the cup and a protrusion positioned within the annulus that defines a recess in the lip;
   wherein the core includes a second annulus in corresponding relationship to the annulus of the stripper plate, the annulus and the second annulus defining the lip, and wherein a second protrusion is located within the second annulus, the protrusion and second protrusion defining the recess,
   introducing the material into the volume to form the cup;
   removing the cavity;
   transitioning the stripper plate with respect to the core thereby disengaging the cup from the core.

2. The method of claim 1, wherein the material is a plastic.

3. The method of claim 1, wherein the protrusion has at least one of an arcuate, a square, and a triangular cross section.

4. The method of claim 1, wherein the protrusion and the second protrusion have substantially identical profiles thereby defining the recess of at least one of an arcuate, a square, a rectangular and a triangular cross section.

5. A method of making a container comprising:
   providing a mold having:
   a core that defines an inner surface of the container,
   a cavity spaced a distance from the core that defines an outer surface of the container, the space between said core and the cavity defining a volume to receive a material,
   a means for removing the container from the core, the means being positioned adjacent to the core and below the container, the means for removing the container having means for forming an annulus in a lip positioned about an open end of the container, and
   a means for forming a recess positioned within the annulus;
   wherein the core includes a second means for forming an annulus, the means for forming an annulus and the second means for forming an annulus defining the lip, and wherein a second protrusion is located within the second annulus, the protrusion and second protrusion defining the recess,
   introducing the material into the device to define the container;
   removing the cavity;
   transitioning the means for removing the container with respect to the core thereby disengaging the container from the core.

6. The method of claim 5, wherein the material is a plastic.

7. The method of claim 5, wherein the protrusion has at least one of an arcuate, a square, and a triangular cross section.

8. The method of claim 5, wherein the protrusion and the second protrusion have substantially identical profiles thereby defining the recess of at least one of an arcuate, a square, a rectangular and a triangular cross section.

* * * * *